(12) United States Patent
Hagenbuch et al.

(10) Patent No.: US 11,517,407 B2
(45) Date of Patent: Dec. 6, 2022

(54) DENTAL MULTI-COLORED MILLING BLANK

(71) Applicant: Ivoclar Vivadent AG, Schaan (LI)

(72) Inventors: Konrad Hagenbuch, Haag (CH); Clemens Andreas Häfele, Weiler (AT); Karl Lanbacher, Laas (IT)

(73) Assignee: Ivoclar Vivadent AG, Schaan (LI)

( * ) Notice: Subject to any disclaimer, the term of this patent is extended or adjusted under 35 U.S.C. 154(b) by 180 days.

(21) Appl. No.: 16/710,886

(22) Filed: Dec. 11, 2019

(65) Prior Publication Data

US 2020/0197140 A1 Jun. 25, 2020

(30) Foreign Application Priority Data

Dec. 20, 2018 (EP) ..................................... 18214891

(51) Int. Cl.
*A61C 13/00* (2006.01)
*A61C 13/08* (2006.01)
*B32B 3/30* (2006.01)

(52) U.S. Cl.
CPC ........ *A61C 13/0022* (2013.01); *A61C 13/082* (2013.01); *A61C 2201/002* (2013.01); *B32B 3/30* (2013.01); *B32B 2535/00* (2013.01); *Y10T 428/216* (2015.01)

(58) Field of Classification Search
CPC ... A61C 13/0022; A61C 13/082; A61C 13/09; B32B 3/30; B32B 2535/00
See application file for complete search history.

(56) References Cited

U.S. PATENT DOCUMENTS

| | | |
|---|---|---|
| 7,604,759 B2 | 10/2009 | Gubler et al. |
| 8,408,902 B2 | 4/2013 | Holzner et al. |
| 8,551,622 B2 | 10/2013 | Ganley et al. |
| 9,744,010 B2 | 8/2017 | Grobbee |
| 9,901,426 B2 | 2/2018 | Reinshagen et al. |
| 10,064,708 B2 | 9/2018 | Burke et al. |
| 10,172,695 B2 | 1/2019 | Okada et al. |
| 10,206,761 B2 | 2/2019 | Burke et al. |
| 10,219,880 B2 | 3/2019 | Rolf et al. |
| 10,265,145 B2 | 4/2019 | Steger |
| 10,314,675 B2 | 6/2019 | Mayr et al. |
| 10,327,874 B2 | 6/2019 | Kutzner et al. |
| 10,405,952 B2 | 9/2019 | Cramer Von Clausbruch |
| 10,405,953 B2 | 9/2019 | Hoshino et al. |
| 10,426,582 B2 | 10/2019 | Savic et al. |
| 10,426,583 B2 | 10/2019 | Jung et al. |
| 10,441,391 B2 | 10/2019 | Volkl et al. |

(Continued)

FOREIGN PATENT DOCUMENTS

| | | |
|---|---|---|
| DE | 102011055393 A1 | 5/2013 |
| WO | 2019035467 A1 | 2/2019 |

OTHER PUBLICATIONS

Translation of DE102011055393 (Year: 2013).*

*Primary Examiner* — Matthew P Travers
(74) *Attorney, Agent, or Firm* — Ann M. Knab; Thad McMurray

(57) ABSTRACT

A dental multi-colored milling blank having at least two layers (16), a transition zone, where material from both layers is present. In the transition zone, a transition geometry exists that extends three-dimensionally. The transition geometry comprises round surfaces facing towards both directions of extension of the layers.

12 Claims, 8 Drawing Sheets

(56) References Cited

U.S. PATENT DOCUMENTS

| | | |
|---|---|---|
| 10,449,020 B2 | 10/2019 | Berggren et al. |
| 10,463,457 B2 | 11/2019 | Jung et al. |
| 10,470,854 B2 | 11/2019 | Burke et al. |
| 10,485,640 B2 | 11/2019 | Volkl et al. |
| 10,500,020 B2 | 12/2019 | Korten et al. |
| 11,090,142 B2 | 8/2021 | Volkl et al. |
| 2013/0101962 A1 | 4/2013 | Howe |
| 2013/0137064 A1* | 5/2013 | Velamakanni ........... A61C 5/73 433/222.1 |
| 2014/0261677 A1* | 9/2014 | Sakamoto ................ G02B 1/11 359/601 |
| 2018/0071063 A1 | 3/2018 | Morse et al. |
| 2020/0015944 A1 | 1/2020 | Geier et al. |
| 2021/0001376 A1 | 1/2021 | Havenith et al. |
| 2021/0128283 A1* | 5/2021 | Kato ...................... A61C 13/26 |

\* cited by examiner

DENTAL MULTI-COLORED MILLING BLANK

CROSS-REFERENCE TO RELATED APPLICATIONS

This application claims priority to European patent application No. 18214891.6 filed on Dec. 20, 2018, the disclosure of which is incorporated herein by reference in its entirety.

TECHNICAL FIELD

The invention relates to a dental multi-colored milling blank, as well as a dental restoration part made by additive manufacturing.

BACKGROUND

It has long been known to use milling blanks for providing teeth, which are either of block-shape or disc-shape, or alternatively to build up suitable teeth in an additive manner.

Fabrication can be based either on plastics, composite or ceramics and is intended to simulate the aesthetic impression of natural teeth.

Natural teeth are made of dentin, which is covered by an enamel layer. The thickness of the enamel layer varies, and the transparency of the enamel affects the appearance of the dentin.

Therefore, for reproduction of artificial teeth, a suitable layer structure is typically selected such that a more transparent tooth material layer is backed by a less transparent tooth material layer.

As far as production of teeth made of plastics is concerned, both highly cross-linked and low cross-linked materials are used. Color transitions between the layers may as well be achieved with low cross-linked materials.

However, durability of such plastics is unfavorable, so that these materials are more suitable for temporary restoration parts.

In case of higher cross-linked plastics, simulation of color gradients with gradual color gradients typically involves working with a large number of individual and differently colored layers.

The differences in shade and opacity between the individual layers are comparatively small, and for a restoration which is rather optically satisfactory it is required to provide five or more layers of the milling blank.

U.S. Pat. Nos. 10,485,640, 10,470,854, 10,463,457, 10,449,020, 10,441,391, 10,426,583, 10,426,582, 10,405,953, 10,405,952, 10,327,874, 10,314,675, 10,265,145, 10,219,880, 10,206,761, 10,172,695, 10,064,708, 9,901,426, 8,551,622, 8,408,902, and 7,604,759 are directed to blanks and processes related to milling or machining blanks and are hereby incorporated by reference.

Typically, blank discs have a diameter of about 100 mm and a height of about 20 mm. For example, with eight layers of different opacity and color intensity, it is also possible to provide a lighter or darker tooth by selecting the appropriate height.

However, if the tooth is shifted to the very bottom, i.e. towards the dentin material, transparency of the cutting material characteristic is missing, and if it is shifted to the very top, i.e. towards the cutting material, the dentin material characteristic is missing, so that such solutions are aesthetically unsatisfactory.

If a comparatively small tooth is to be produced, it is often not possible to achieve the desired covering with at least three layers.

In addition, the layering of many layers is elaborate and error-prone.

Mixing of the materials is not possible in highly cross-linked plastic systems, as the materials usually show pasty consistency, so that realization of a color gradient is not possible.

Moreover, it has already been proposed to provide a transition zone, in which both first and second layer materials are present. Such solutions have not yet been implemented, as they did not reduce the number of layers required, and because the appearance of the tooth was unsatisfactory, especially for teeth having low opacity, i.e. transparent enamel material.

SUMMARY

On the other hand, the object of the invention is to create a multi-colored milling blank as well as a multi-colored restoration part made by additive manufacturing, which is aesthetically significantly more satisfactory, wherein especially the number of layers required can be reduced and applicability of permanent dental restoration parts should also be achievable.

According to the invention, this object will be solved by the claims. Advantageous embodiments will arise from the subclaims.

Thus, it is the object of the invention to realize a specific three-dimensional transition geometry in the transition area between the two layers, in which round surfaces are provided facing towards both directions of extension of the two layers. The round surfaces are convex, but also concave and extend across crests and valleys in a multidimensional alternating manner. A crest is surrounded by valleys in both directions.

Between the crests and valleys there are slopes also facing towards all directions, obliquely extending in relation to the extension plane of the layers.

This solution surprisingly results in such an aesthetically pleasant result for both light and dark teeth, such that only two layers are required. This considerably simplifies realization of both the milling blank and the corresponding additive restoration part.

According to the invention, use of highly cross-linked plastics for the materials is intended, so that good durability will be achieved.

The round surfaces according to the invention are three-dimensionally curved, such that they have a curvature that simultaneously extends in different spatial directions.

An example of such a curvature is a half torus. When viewed in one spatial direction, it is semicircular in shape, and when viewed in the other spatial direction, it is circular in shape. The surface is curved in two spatial directions, thus forming round surfaces that bend in several directions of the layers.

Surprisingly, the particularly curved round surfaces according to the invention provide the desired aesthetic result and allow significantly reduced number of layers to be used, for example only two or three layers.

In an advantageous embodiment, the round surfaces are formed at least partly elliptical.

Apparently, the stochastically evenly distributed distribution of the refraction angles or reflection angles at the interface between the layers is beneficial.

Preferably, the two layers considered are connected with each other in a positive fit, for example by thermal treatment of at least one of the layers when joining the layers of the milling blank or, for example, by melting in during additive manufacture of the dental restoration part.

According to the invention, it is advantageous for the desired shade transition to optically appear in the same way both in large and small teeth, as the desired aesthetic result now may be achieved with only one shade transition.

It is to be understood that the position of the interface within the dental restoration can be adapted to the requirements in a wide range. If a complete dental arch is realized, the interface can extend essentially parallel to the occlusal plane. If only one or two front teeth are to be realized, it is possible to adapt the position of the boundary layer to the requirements; for example, an inclination matching the course of the natural boundary layer between the enamel and the dentin is possible to be realized herein.

If necessary, the boundary layer may also be macroscopically structured, for example curved and/or undulated, in order to simulate the natural course of the boundary surface.

From a microscopic point of view, a grid is preferred for the boundary surface, i.e. periodically recurring structures of the round surfaces, which are repeated in both directions of extension of the two layers.

In this respect, the invention provides base elements on which the round surfaces are formed. For example, the base elements may be between 0.01 mm and 3 mm in size, and the radii of the round surfaces may also be in the same order of magnitude, for example between 5000 nm and 4 mm.

According to the invention, it is especially advantageous for the base elements to be arranged in a hexagonal structure, or honeycomb structure, harmonically merging into each other.

This can be achieved, for example, by intersecting the round surfaces, especially when a structure of knobs is created, where elevations and depressions alternate in a regular manner.

The knobs are then preferably formed as round knobs, i.e. having spherical upper sides with depressions or channels therebetween, also comprising symmetrical round surfaces.

In accordance with the invention, it is also particularly important for the round surfaces to not only face towards one of the layer extension directions, but in both layer extension directions. This is a prerequisite for the angle of reflection or the angle of refraction to continuously change in both spatial directions.

Experiments on round surfaces facing only in one direction have revealed an aesthetically significantly poorer impression, which also depends on the viewing angle of the observer.

According to the invention, it is intended for the height of the base elements to be in the same order of magnitude as their size, preferably between 10 and 60% of the size. This results in round surfaces having an inclination of 45 degrees, wherein it is understood that, according to the invention, the inclination angle in both spatial directions is an extremely wide Gaussian curve.

If the inclination angle of the boundary surface is observed across the directions of extension of the layers according to the invention, the distribution is essentially linear, having a center of gravity at the mean inclination of about 30 degrees, wherein the frequency distribution also encompasses the end values such as 0 degrees and 60 degrees, such that they have more than half the frequency of the maximum frequency.

Preferably, the frequency distribution of the inclination angles in both spatial directions of both directions of extension is essentially the same.

In an advantageous embodiment of the invention, three layers are provided, a cutting material layer, a center layer and a dentin layer. The center layer preferably is closer to the cutting side of the blank than to the dentin side of the blank.

According to the invention, even if the connection of highly cross-linked plastics is prevailing, it cannot be excluded that, despite the pasty consistency thereof, minimal mixing may still occur as a result of pressure and/or heat when adjoining the layers. This makes the transition between the two layers even more diffuse, even if this mixing range is as narrow as only a few nanometer up to perhaps 500 nm.

Instead, it is also possible to glue the layers together, wherein the adhesive layer may be 50000 nm in thickness, for example.

According to the invention, the following effect may also be observed due to the extremely good reflection of the different angles in the transition zone between the layers:

The transition between the center layer and the dentin layer is per se stronger in color and more contrasting than that between the enamel material layer and the center layer. Nevertheless, it is not or practically not visible, because the less deep transition zone, i.e. the more vestibular or occlusal transition zone, i.e. the transition zone between the incisal mass layer and the center layer, has a masking effect to the extent that no details are visible in the deeper transition zone, i.e. the oral or gingival transition zone.

This even applies if the transition between the center layer and the cutting mass is not structured according to the invention, but if a smooth transition is provided therein.

Preferably, however, both transition zones are provided with round surfaces facing at least partially towards several directions.

Obviously, the curvature around vertical axes is particularly important at the round surfaces. It has the strongest reflection and dissolving effects, so that the already mentioned unique knob structure is preferred.

According to the invention, it is advantageous if, for each tooth of the milling blank, there is a transition zone which is separated from the neighboring tooth, having an apex which is adjacent to the occlusal plane, and arch flanks that decline in the oral and vestibular, but also in the mesial and distal direction towards the gingiva.

According to the invention, it is advantageous for the round surfaces to be formed on circular segments the axis of which extends perpendicularly to the direction of extension of the blank.

According to the invention, it is advantageous for the blank to be cylindrically flat and especially to be designed as a circular disc having a diameter of between 60 and 120 millimeters.

According to the invention, it is advantageous for round surfaces to be built at horizontally cut (half) gates, again as viewed from the occlusal direction.

According to the invention, it is advantageous for the round surfaces to be hexagonal in structure, the central torus opening of which is closed especially by a ball segment, or the central torus opening of which is flatly closed.

According to the invention, it is advantageous for the amount of each base element to be 1% to 300% of the size of the base element, especially between 10% and 100%.

According to the invention, it is advantageous for the base elements to be cut to 10 to 50% of their sizes.

According to the invention, it is advantageous for the intersections to be rounded, especially with a radius of curvature between 0.1 mm and 1.3 mm, preferably between 0.4 and 0.7 mm.

According to the invention, it is advantageous for the radius of curvature of the round surfaces to be 5 to 50%, especially 15 to 20% of the size of each base element.

BRIEF DESCRIPTION OF THE DRAWINGS

Further advantages, details and features will arise from the following description of an example embodiment while make reference to the drawing, wherein.

DETAILED DESCRIPTION

Figure 1A:
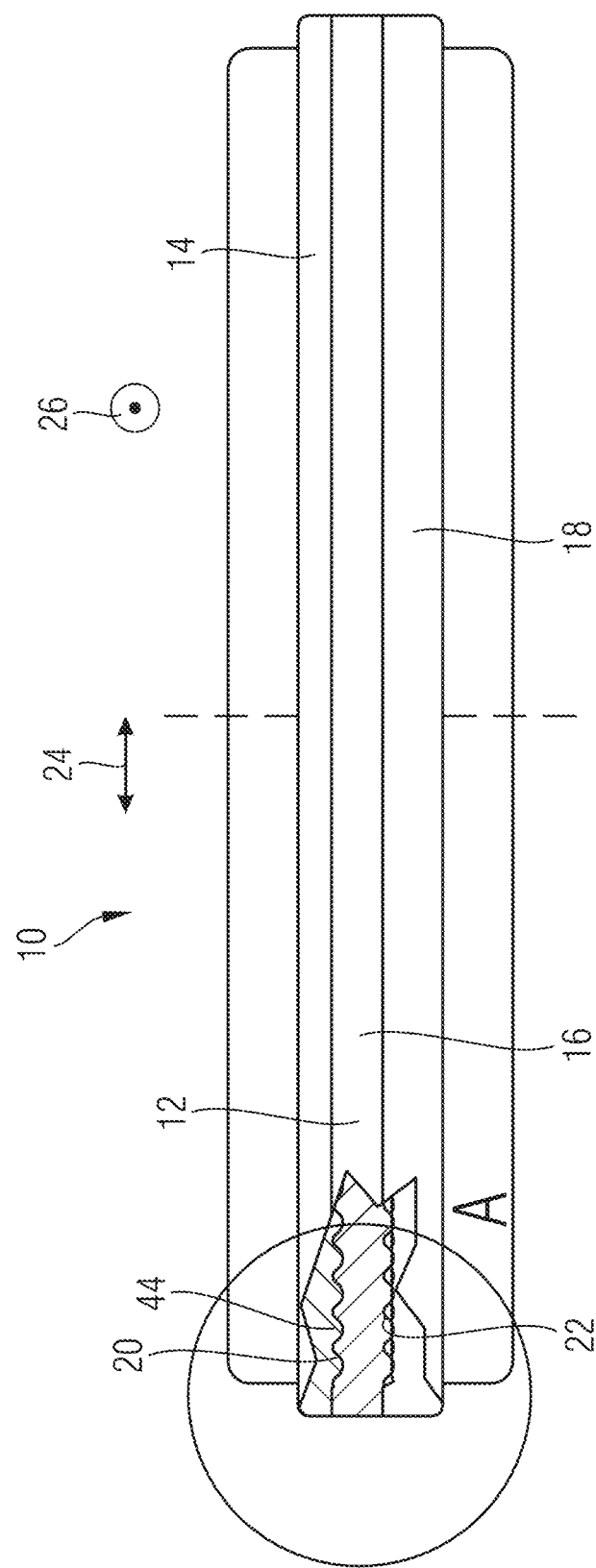
FIG. 1A is a side view partially broken away across a multi-colored milling blank according to the invention, in one embodiment.
Figure 2A:
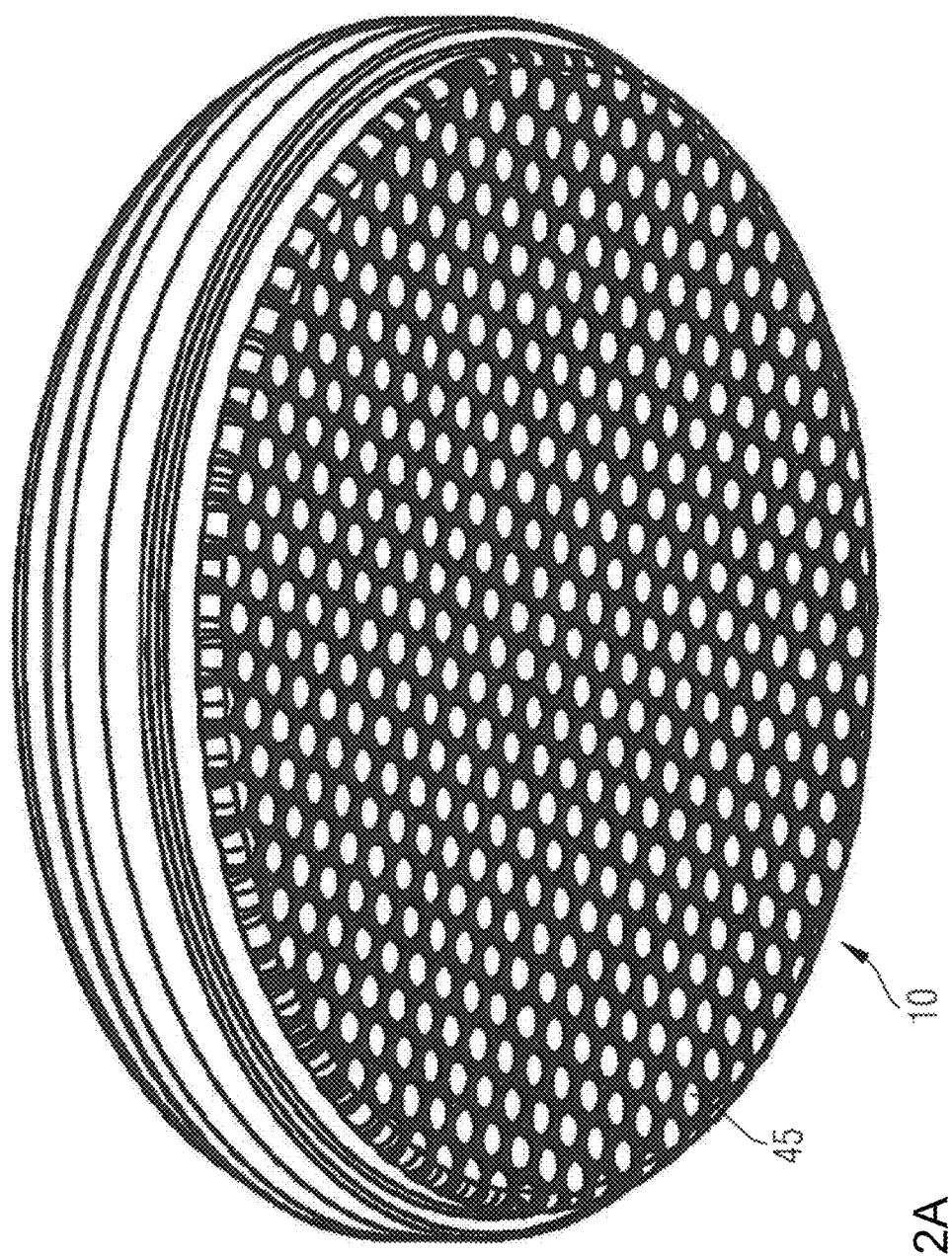
FIG. 2A is a perspective bottom view across the milling blank of FIG. 1A.

The milling blank 10 shown in FIGS. 1A and 2A is disc-shaped in a manner known per se and has a diameter of almost 100 mm. The height of the milling blank 10 is 20 mm.

In a manner also known per se, it comprises a circumferentially projecting edge 12, which is for clamping into an appropriate holder in the milling machine.

In the embodiment shown, the milling blank comprises three layers, namely an enamel layer 14, a center layer 16 and a dentin layer 18.

Between the three layers 14 to 18, a transition zone is located, between the enamel layer 14 and 16 the transition zone 20 and between the center layer 16 and the dentin layer 18 the transition zone 22.

Figure 1B:
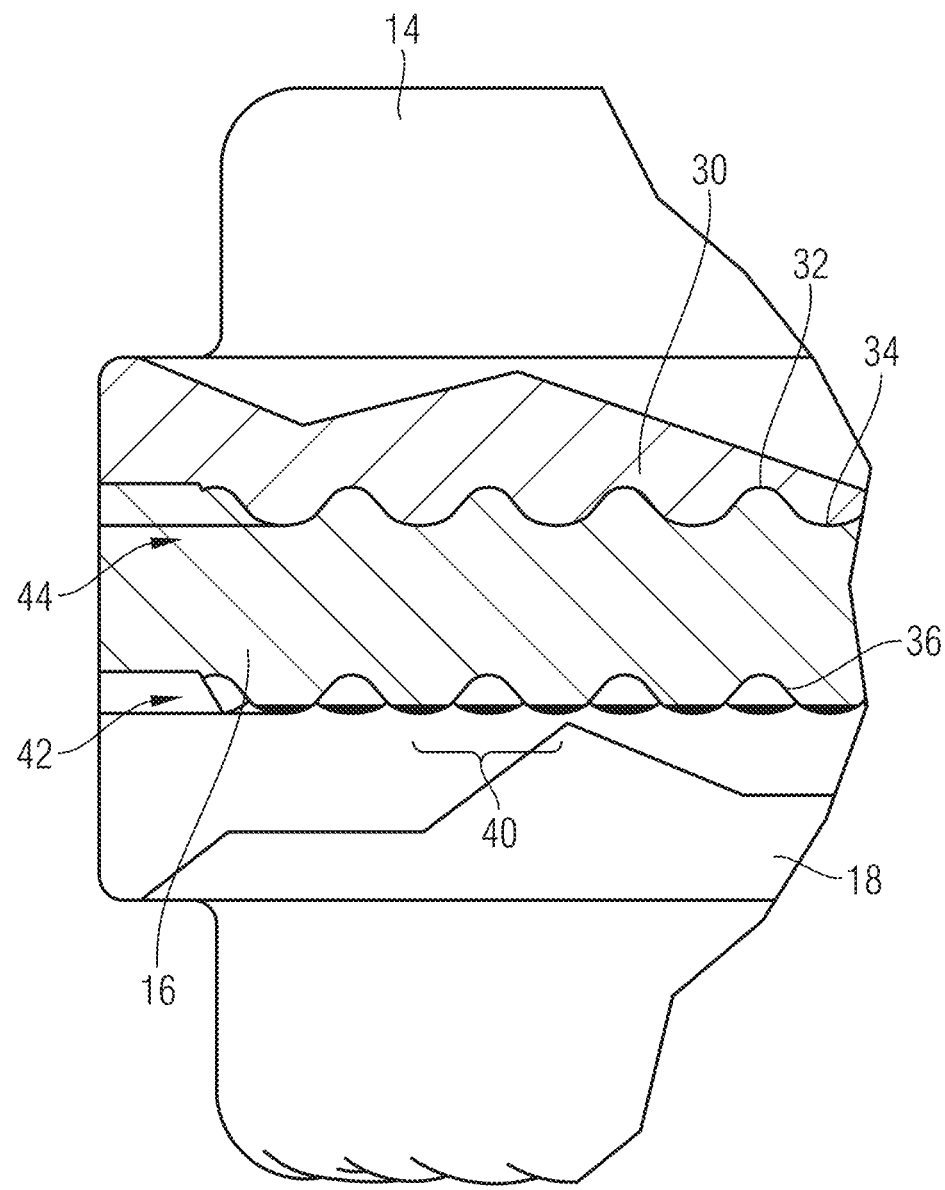
FIG. 1B is an enlarged detailed representation of the embodiment of FIG. 1A.

Each transition zone 20 and 22 has a specific transition geometry according to the invention, which is three-dimensional and, according to the invention, comprises round surfaces 30 facing towards both directions of extension, as is will be further explained in FIG. 1B below.

Herein, the direction of extension 24 runs in the X direction and the one crossing the drawing plane is the Y direction 26.

In both transition zones 20 and 22, the transition geometry is similar, wherein it is to be understood that, depending on the example embodiment, different transition geometries, e.g. different grid dimensions, can also be realized.

Round surfaces 30 are formed at crests 32 and valleys 34. Between the crests 32 and the valleys 34 inclined slopes 36 are located, which extend diagonally towards both directions of extension 24 and 26, but still facing towards both directions of extension 24 and 26.

The crests 32 are formed as such peaks, and in this respect, each forming a knob having an essentially circular cross-section.

The valleys 34, on the other hand, are connected with each other around the crests 32, so that they also essentially extend circularly around the crests 32.

The slopes 36 have a slope gradient that is at its maximum in the center thereof and that starts from the top of the crest 32 and smoothly ends in the valleys 34.

In this respect, the radius of curvature of the valleys 34 is slightly larger than the radius of curvature of the crests 32.

In the example shown, the crests 32 and valleys 34 extend in a grid, and each combination of a crest 32 with the associated circumferential valley 34 forms a base element 40 having the associated transition geometry 44 and 42, respectively.

In the example shown, the grid dimension is about 2.5 mm, being the distance between the peaks of adjacent crests 32. The height, i.e. the vertical distance between crests 32 and valleys 34, is about half the grid dimension.

Furthermore, the distribution of the layers is provided as shown in the following example embodiment:

Height of melting material layer 14: 8 mm
Height of center layer 16: 3 mm
Height of the dentin layer 18: 9 mm From FIG. 2A it can be seen that the back side of the milling blank 10 is also structured, in the example having a knob structure 45.

Figure 2B:
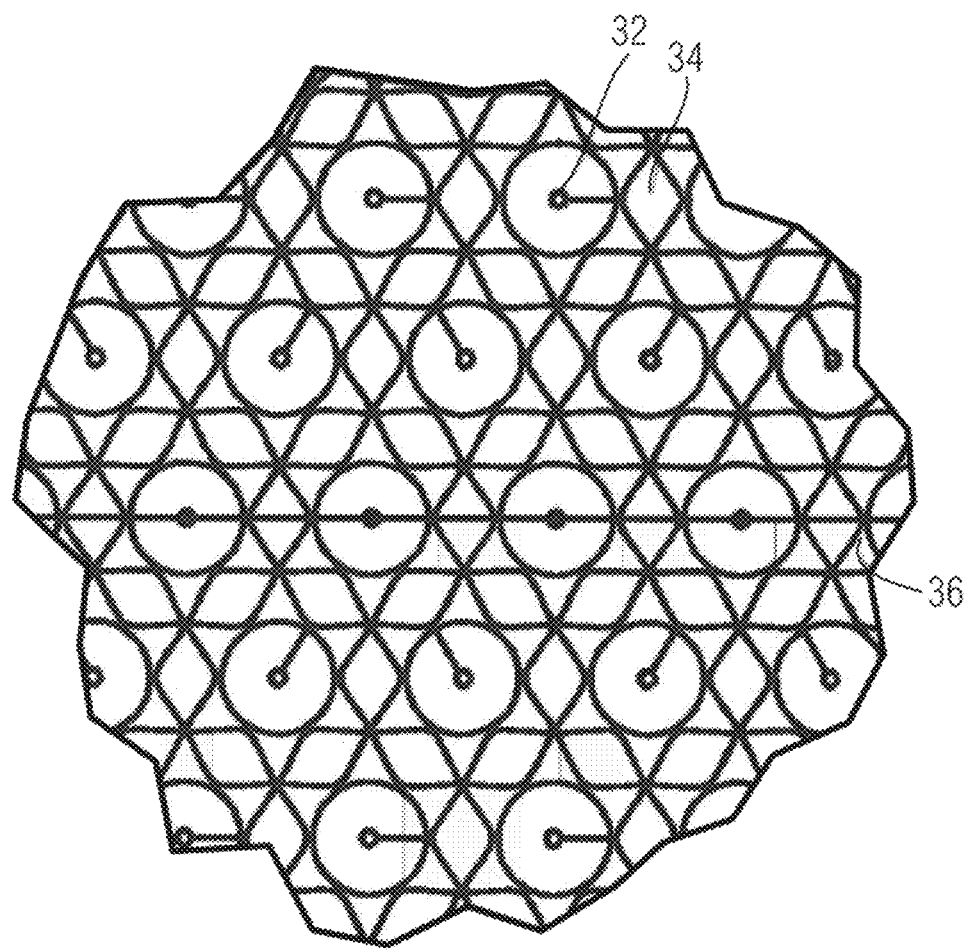
FIG. 2B is an enlarged detailed view of FIG. 1A, in top view.

Such a structure comprises a hexagonal base structure; in this respect, this base structure corresponds to a possible structure of the transition geometries 32 and 34, which can be seen in the top view of FIG. 2B. It is to be understood that any other base structure, especially polygonal, is allowed instead.

In the example embodiment, the transition geometries 44 and 42 are congruent, so that in the position where crests 32 are provided in the transition geometry 44, such crests are also found in the transition geometry 42.

Other arrangements for the elevations are possible. For example, it is possible to arrange the elevations in an annular form, i.e. with a central starting point and surrounded by rings with an increasing number of elevations.

It is to be understood that an offset is also possible instead, which may be favorable for reduction of reflection.

Figure 3:
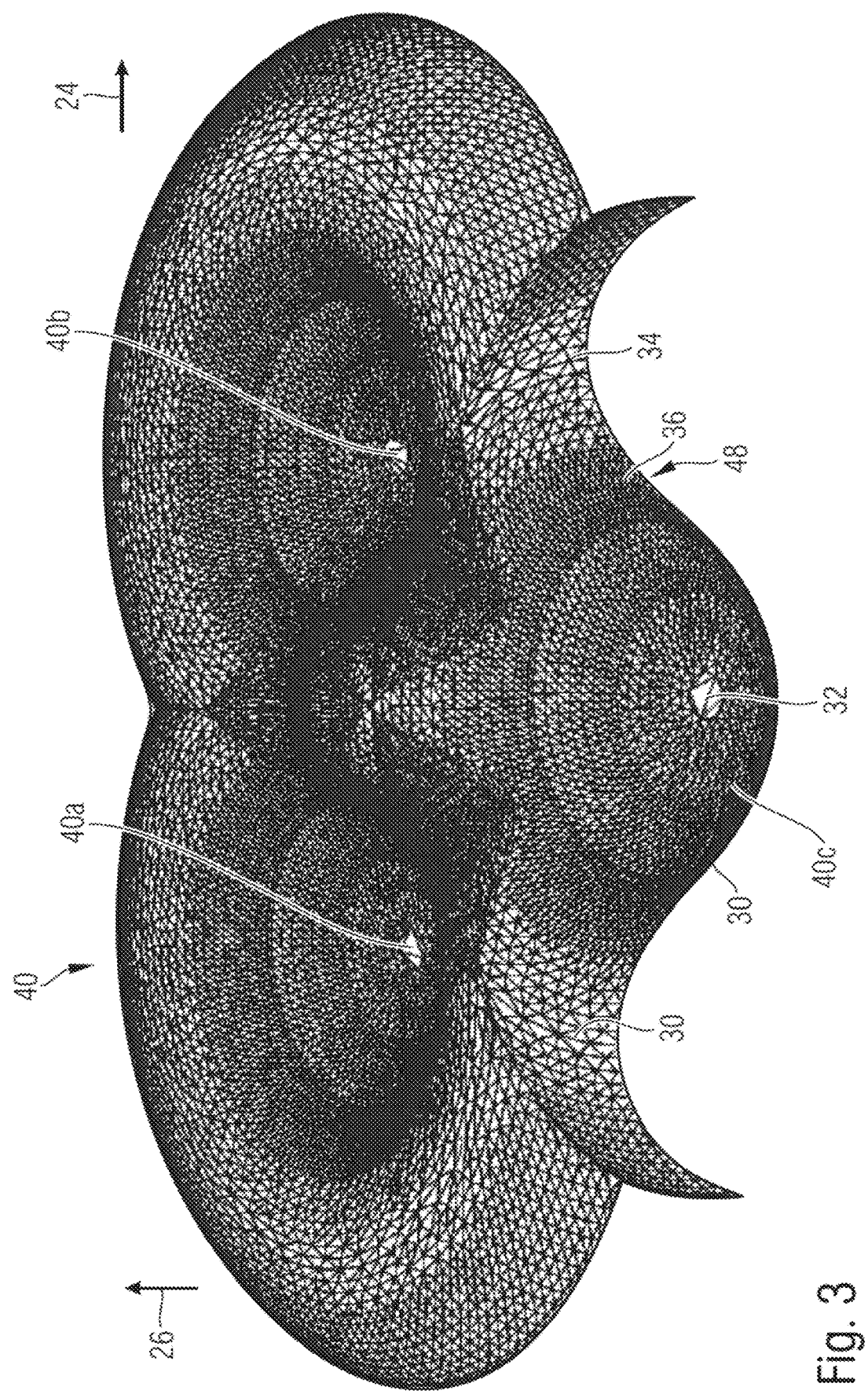
FIG. 3 is a schematic representation of 3 base elements as to the transition geometry for the milling blank of one of the figures.

FIG. 3 shows how a base element 40 can be implemented. For clarification, three base elements 40a, 40b and 40c are shown herein, and in the example embodiment represented herein, they are shown merging into each other.

The view of FIG. 3 corresponds to the sectional view of FIG. 2B, but basically as viewed from an angle at the bottom. In addition, the crests 32 in FIG. 3 are below and the valleys 34 in FIG. 3 above.

The valleys 34 surround each of the downwardly knob-shaped crests 32.

The slopes 36 between the crests 32 and the valleys 34 intersect each other in adjacent base elements 40, so that gentle transitions result having a plurality of round surfaces 30, which are partly inclined, partly also having a vertical surface normal.

The slopes 36 are inclined in the directions 24 and 26. The inclination of the slope increases from crest 32 and decreases again at a turning point 48 until it reaches zero at the center of each valley 34.

Herein, the slope inclination at the turning point 48 is about 35 degrees, wherein it is understood that the inclination as mentioned is adaptable to the requirements in wide ranges.

Figure 4:
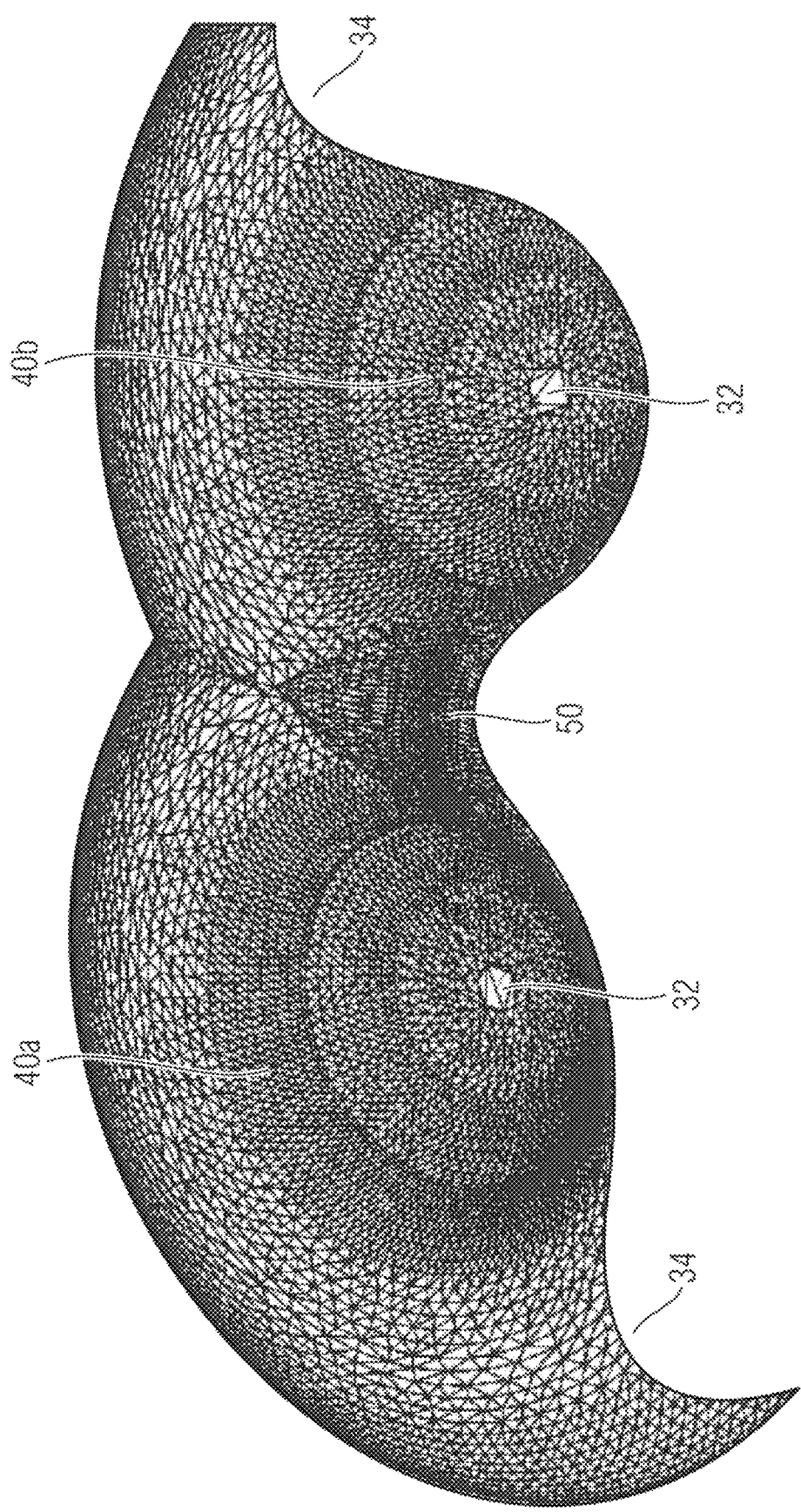
FIG. 4 is another view of the detailed structure of FIG. 3.

From FIG. 4, another perspective view of the base elements 40a and 40b according to the invention is shown. The crests 32 extend in a rounded conical shape from the surrounding valleys 34. Thus, at the transition point 50, the imaginary center between two crests 32, i.e. the valley incision, is a little less deep.

Figure 5:
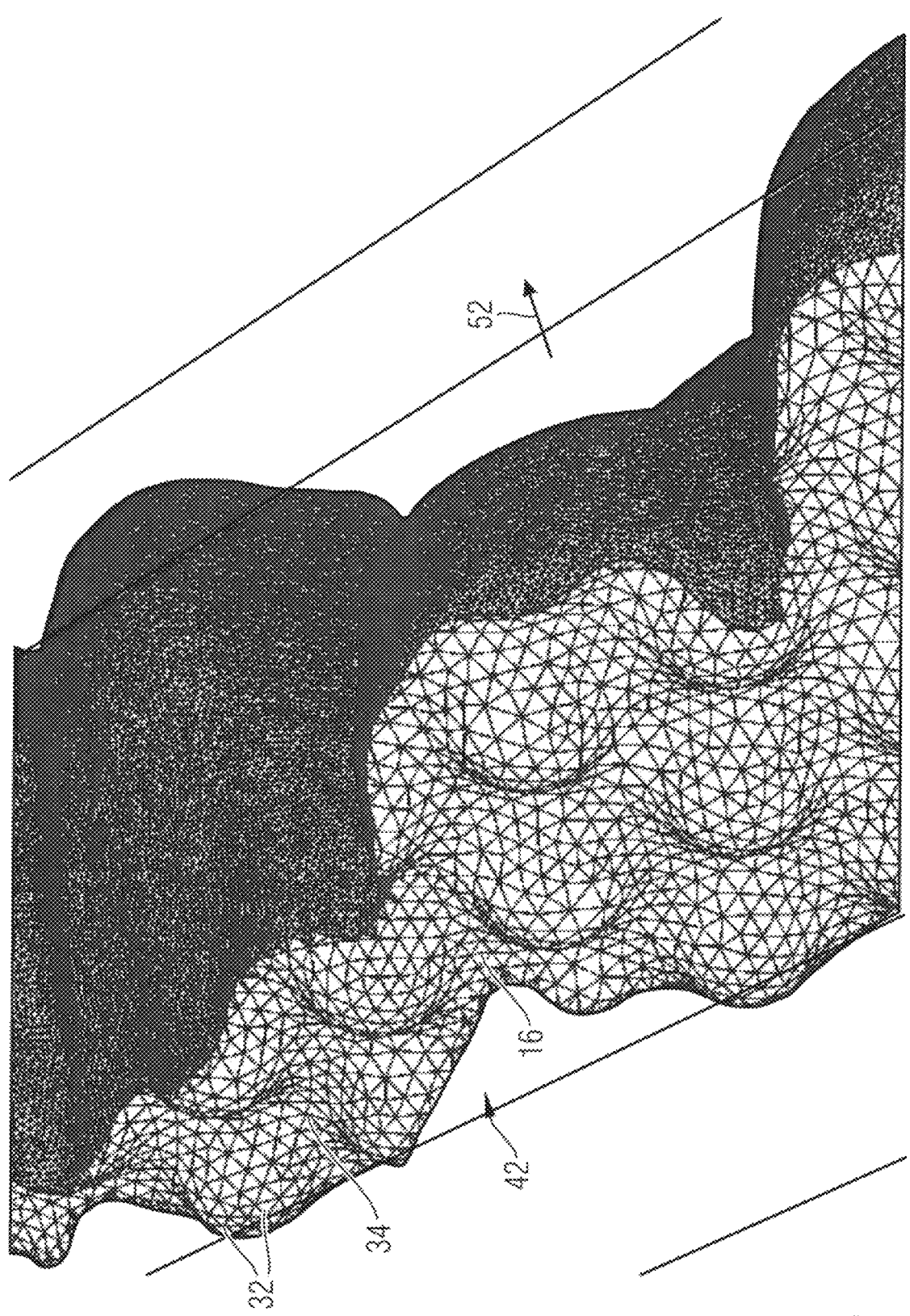
FIG. 5 is an enlarged view of a part of a dental restorative section, made of a milling blank according to the invention.

FIG. 5 shows a center layer 16 of a dental restoration part, which has the unique transition geometry 42 towards the dentin layer 18. In the occlusal direction 52, a cutting mass layer extends, not shown herein.

As can be seen in this example, the crests 32 face towards the occlusal direction 52, whereas the valleys 34 opposite the crests 32 are shifted away from the occlusal side 52.

It is to be understood that a modified embodiment is also possible instead, in which the sequence of crests 32 and valleys 34 is reversed.

Figure 6:
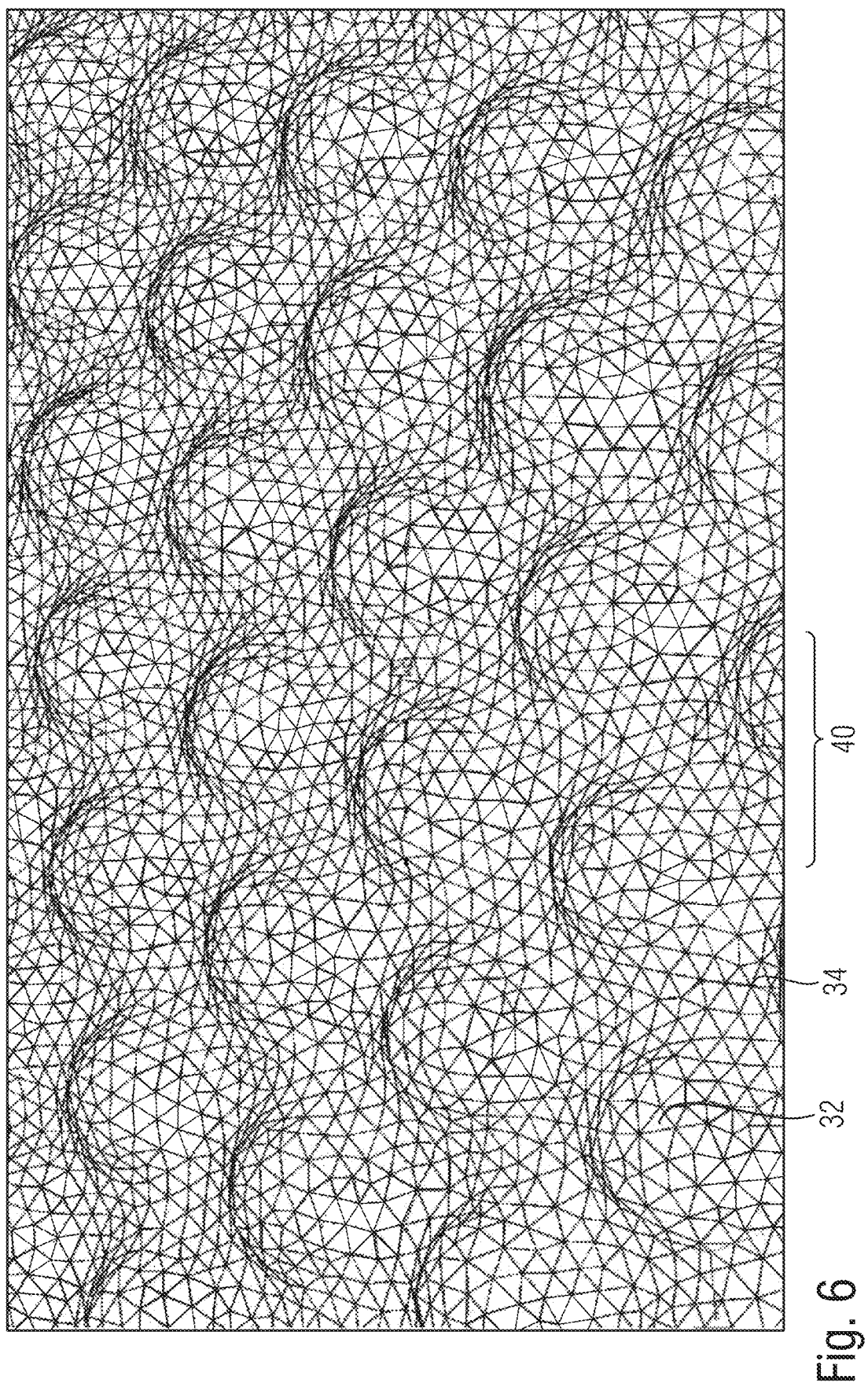
FIG. 6 is an enlarged view of FIG. 5.

From FIG. 6, the structure of the crests 32 and valleys 34, each forming base elements 40, is enlarged.

It can be seen that the base structure of the base elements 40 is hexagonal and the base elements 40 extend symmetrically to each other.

The invention claimed is:

1. A dental multi-colored milling blank comprising
at least two layers of materials having different color and/or brightness which are adjacent to each other and are bonded to each other,
wherein a transition zone (22) exists therebetween across at least a part of an extent of the at least two layers and comprises both a material of a first layer and a material of a second layer, and at least one transition geometry (32) of the layers extending three-dimensionally in the transition zone (22),
wherein the transition geometry (32) comprises round surfaces (30) which are adjoined by slopes (36) obliquely facing towards two directions comprising an X-direction and a Y-direction (24, 26) based on a Cartesian coordinate system in a plane in which the layers extend,
wherein each round surface (30) is the center of a base member, which base member is in the shape of a half-torus, regularly recurring across the extent of the transition zone (22) of the layers, the base members merge into one another by intersections of the round surfaces forming a grid of hexagonal structure which remains constant across the entire transition zone (22), each base member comprises a crest (32) and an associated circumferential valley (34), and
wherein the round surfaces (30) comprise pitches at 45 degrees or less to the two directions (24, 26) in which the layers extend.

2. The multi-colored milling blank according to claim 1, wherein the transition zone (22) exists between the first layer of material and the second layer of material,
wherein the first layer of material comprises a dentin material and the second material comprises an enamel material.

3. The multi-colored milling blank according to claim 1, wherein the first layer comprises a dentin material,
wherein the second layer comprises a center material,
wherein a third layer comprises an enamel material,
wherein the transition zone is formed between the dentin material and the center material and
wherein a second transition zone (22) is formed between the center material and the enamel material.

4. The multi-colored milling blank according to claim 1, comprising
a plurality of transition zones (22, 24), each transition zone located between adjacent layers and extending three-dimensionally.

5. The multi-colored milling blank according to claim 1, wherein each round surface (30) has a radius of curvature which is constant across more than half of the round surface (30) or across the entire round surface (30).

6. The multi-colored milling blank according to claim 1,
wherein the multi-colored milling blank is used to fabricate dental restoration parts,
wherein the round surfaces (30) are formed on knobs which extend away from a basal side of the dental restoration parts to be subsequently fabricated or towards an occlusal (52) and/or oral and/or vestibular direction.

7. The multi-colored milling blank according to claim 1,
wherein the milling blank comprises one or more transition zones,
each one or more transition zone (22) extends in a plane which is parallel to or is at most at an angle of less than 40 degrees to an occlusal plane or at an angle of less than 20 degrees to the occlusal plane.

8. The multi-colored milling blank according to claim 7,
wherein each transition zone (22) extends along a dental arch having an arc geometry with a crest line adjacent to the occlusal plane and with arc flanks descending orally or vestibularly from the crest line in a basal direction.

9. The multi-colored milling blank according to claim 1,
wherein the round surfaces (30), as viewed from a basal direction, are designed as a surface having round recesses, and/or
wherein the round surfaces (30) merge into one another at round recesses, as viewed from an occlusal direction (52).

10. The multi-colored milling blank according to claim 1, wherein the first layer, the second layer and a third layer are different with respect to the color and/or brightness.

11. The multi-colored milling blank according to claim 1,
wherein two transition zones (22) extend substantially parallel to each other, and each comprise round surfaces (30) which are offset to each other.

12. A dental multi-colored restoration part made by additive manufacturing, comprising
at least two layers which include materials of different color and/or brightness which adjoin each other and are connected to each other,
wherein a transition zone (22) exists therebetween across at least part of an extent of the at least two layers and comprises both a material of a first layer and a material of a second layer, and a transition geometry (32) of the at least two layers extending three-dimensionally in the transition zone (22),
wherein the transition geometry (32) comprises round surfaces (30) which are adjoined by slopes (36) obliquely facing towards two directions comprising an X-direction and a Y-direction (24, 26) based on a Cartesian coordinate system in a plane in which the layers extend,
wherein each round surface (30) is the center of a base member, which base member is in the shape of a half-torus, regularly recurring across the extent of the transition zone (22) of the layers, the base members merge into one another by intersections of the round surfaces forming a grid of hexagonal structure which remains constant across the entire transition zone (22), each base member comprises a crest (32) and an associated circumferential valley (34), and wherein the round surfaces (30) comprise pitches at 45 degrees or less to the two directions (24, 26) in which the layers extend.

\* \* \* \* \*